United States Patent [19]

Carteau et al.

[11] Patent Number: 5,325,488
[45] Date of Patent: Jun. 28, 1994

[54] PERIPHERAL MASS MEMORY SUBSYSTEM HAVE IDENTICAL CONTROLLERS CONNECTED TO TWO PARALLEL BUSES FOR ACCESSING DISK MEMORY BANKS, SOLID-STATE DISKS, AND CACHE MEMORIES

[75] Inventors: Daniel Carteau, Montigny le Bretonneux; Philippe Schreck, Maurepas; Patricia Giacomini, Bois d'Arcy, all of France

[73] Assignee: Bull S.A., Paris, France

[21] Appl. No.: 662,567

[22] Filed: Feb. 28, 1991

[30] Foreign Application Priority Data

Mar. 8, 1990 [FR] France ................. 9002962

[51] Int. Cl.$^5$ .............................. G06F 12/00
[52] U.S. Cl. ...................... 395/275; 395/800; 395/425; 364/243; 364/268.3; 364/268.6; 364/DIG. 1; 364/944.2; 364/964; 364/968
[58] Field of Search ............... 395/800, 275, 425

[56] References Cited

U.S. PATENT DOCUMENTS

| | | | |
|---|---|---|---|
| 4,535,404 | 8/1985 | Shenk ..................... | 395/275 |
| 4,747,047 | 5/1988 | Coogan et al. ............ | 395/275 |
| 4,780,808 | 10/1988 | Moreno et al. ........... | 395/800 |
| 4,821,170 | 4/1989 | Bernick et al. ........... | 395/275 |
| 4,825,357 | 4/1989 | Ovies et al. .............. | 395/275 |
| 4,868,734 | 9/1989 | Idleman et al. ........... | 395/275 |
| 4,896,266 | 1/1990 | Klashka et al. ........... | 395/275 |
| 4,931,922 | 6/1990 | Baty et al. ................ | 395/275 |
| 5,038,275 | 8/1991 | Dujari .................... | 395/275 |
| 5,088,029 | 2/1992 | Koyama .................. | 395/275 |
| 5,133,060 | 7/1992 | Weber et al. ............. | 395/425 |

FOREIGN PATENT DOCUMENTS 0287301 10/1988 European Pat. Off.

OTHER PUBLICATIONS

IBM Technical Disclosure Bulletin, vol. 26, No. 7B, Dec. 1983, H. O. Hempy, Multipathing in Peripheral Storage Systems, pp. 3820-3821.

Primary Examiner—Thomas C. Lee
Assistant Examiner—Paul Harrity
Attorney, Agent, or Firm—Stowell, Kondracki & Clarke Kerkam

[57] ABSTRACT

A peripheral mass memory subsystem ($PSS_1$, $PSS_2$) of an information processing system including at least one central host ($H_1$, $H_2$, $H_4$, $H_4$), two control units ($UC_1$, $UC_2$) and at least one mass memory ($BMD_1$, $BMD_2$, ...) with independent electrical power supplies ($ALIM_1$, $ALIM_2$, $BAT_1$, $BAT_2$) and each having a plurality of structural (hardware+microsoftware) elements ($PR_1$–$PR_2$, $DE_1$–$DE_2$, $CA_1$–$CA_2$, $HA_1$–$HA_2$, $DA_1$–$D_2$) connected to a first and/or a second parallel-type bus ($B_1$, $B_2$). The subsystem is characterized in that it includes a microsoftware architecture (AML) that executes the commands of the host and informs the host of changes in state of the mass memory and is embodied by a plurality of functional microsoftware subassemblies (P, H, D, C, S), each of them specific to each structural element of each control unit and implemented in its hardware structure.

9 Claims, 10 Drawing Sheets

PROCESSING OF COMMAND TO READ
A BLOCK IN CACHE $CA_1$ - $CA_2$ AND IN DISKS

| HOST ADAPTOR | DISK MEMORY ADAPTOR |
| HA₁ | DA₁ |

1 RECEPTION OF CMD IN STACK
2 RESOURCE ADDRESS DECODING
3 MAKING UP OF COMMAND MSG

4 MSG CMD →

5 HOST COMMAND DECODING
6 VERIFICATION OF VALIDITY
7 RESOURCE RESERVATION
8 PAGE ALLOCATION $MTD_1$

← INFO REQUEST 20

21 PAGE ALLOCATION $MTH_1$
22 TRANSFER NOTIFICATION   24
23 INFO TRANSFER

ASK $MTD_1$ →

← $MTD_1$ AGREED  25

26 INFO TRANSFER →

27 MAKEUP OF MSG RESPONSE
   IF CACHE $CA_1$ ($CA_2$) USED

← MSG RESPONSE 28

29 SEND COMPLETE

30 WRITING OF DISK
31 RELEASE OF DISK
32 RELEASE OF $MTD_1$

← MESSAGE TO RELEASE $MTH_1$  33

34 RELEASE OF $MTH_1$

PROCESSING OF COMMAND TO WRITE
A BLOCK IN CACHE $CA_1$ - $CA_2$

*FIG. 8A*

PERIPHERAL MASS MEMORY SUBSYSTEM HAVE IDENTICAL CONTROLLERS CONNECTED TO TWO PARALLEL BUSES FOR ACCESSING DISK MEMORY BANKS, SOLID-STATE DISKS, AND CACHE MEMORIES

FIELD OF THE INVENTION

The present invention relates to a peripheral mass memory subsystem. More particularly, it relates to the hardware and microsoftware architecture thereof, and it is applicable to all types of information processing systems.

BACKGROUND OF THE INVENTION

An information processing system is known to be constituted of at least one central processing unit or central host, formed of at least one central processor and one main memory to which the processor is connected; a plurality of peripherals; and at least one input-/output processor assuring control of the exchange of data between the main memory and the various peripherals.

Peripheral control units, or controllers, are associated with various peripherals and assure the physical transfer of the data between the central host and the peripherals associated with the various controllers.

Generally, all the constituent functional elements of an information processing system at the same geographical location are connected to the same parallel bus, which assures the transportation of the data between the various boards that these elements have and the electrical power supply to the system.

A bus that is especially widely used at present is the Multibus II. Multibus II is a trademark of the Intel Corporation. The architecture of Multibus II is structured about a main bus of the parallel type, standardized by the Institute of Electrical and Electronic Engineers (IEEE) Standard 1296.

Mass memories, such as rotary magnetic disk memories or optical disk memories, are among the most-often used peripherals. They are very widely used, because they make the storage of very great quantities of information and relatively rapid access to the information possible. Their mean access time is on the order of 20 to 25 ms. The capacities of the highest-powered disk memories on the market exceed one gigabyte.

Among mass memories, memories known as electronic memories, also known as electronic disks (or solid-state disks), which use semiconductor memories, are currently being developed. Their access time is far less than a millisecond (that is, several tens of times less than the access time of the highest-powered rotary disk memories), and they have no rotating parts. Nevertheless, their unit memory capacity cost is still high, on the order of 20 times that for magnetic disk memories. However, the unit memory capacity cost of the electronic memories is decreasing much faster than that of rotary magnetic disk memories, and it can be expected that the cost will be equivalent within a few years. It may then be believed useful to use both rotary magnetic disk memories and solid-state disks as peripherals for an information processing system.

The structure of information processing systems is increasingly complex and requires more and more elements. Moreover, the volume of data to be processed by such a system is quite high and requires the use of an increasingly large number of mass memories where the data must be stored before being processed by the central processors of the system. As a result, the management of an entire such system by its central processing unit is extremely complex.

It is accordingly desirable to decentralize the management of the set of elements comprising an information processing system at the level of a plurality of subsystems, each of which manages one portion of the elements of the system, and in particular the peripherals.

OBJECT AND SUMMARY OF THE INVENTION

It is precisely the object of the present invention to provide a peripheral mass memory subsystem that, instead of the central unit, handles not only the transfer of data from the central unit to the mass memories but also the writing and reading of the information in the mass memories.

A subsystem of this kind must have the best possible availability and must enable high-powered performance.

Moreover, access to the data must be fully protected; that is, access must be possible at any moment to any of the data contained in the mass memories managed by the subsystem, regardless of the circumstances, whether there is a partial or total failure, or down time for maintenance, in all or some of the elements of the system.

In other words, the central host must have access to any of the data contained in the mass memory managed by the subsystem, without having to be preoccupied with how the subsystem actually manages it, regardless of the functional incidence that may affect the subsystem or the mass memory. For the host, this is what is meant by the availability of the data.

To this end, the peripheral mass memory subsystem according to the invention is constructed in a modular hardware architecture designed around two parallel buses of the Multibus II type, in which the number of hardware elements (logic boards) of different types is extremely reduced. These hardware elements have parts identical to one another, and the microsoftware programs implemented on these various hardware elements are also modular and include a plurality of functional subsets that are each implemented on a predetermined hardware element, the subsets of the microsoftware architecture being formed of microsoftware modules, part of which is identical from one subassembly to the other.

According to the invention the peripheral mass memory subsystem belonging to an information processing system including at least one central host includes two control units for controlling at least one mass memory, and independent electrical power supplies, and each control unit has a plurality of structural (hardware+microsoftware) elements connected to a first and/or a second parallel bus. The mass memory subsystem includes microsoftware architecture that executes the commands of the control host and informs it of changes in state of the mass memory, embodied by a plurality of functional subassemblies, each of which is specific to each structural element of each control unit and is implemented in its hardware structure.

Further characteristics and advantages of the present invention will become apparent from the ensuing detailed description, given by way of example, taken in conjunction with the drawings.

BRIEF DESCRIPTION OF THE DRAWINGS

FIG. 7, including FIG. 8, including FIGS. 8A and 8B, is a flow chart of the dialog between the host adaptor and the disk memory adaptor, on the one hand, and between the host and disk adaptors and the cache memory on the other hand, which makes it possible to implement the operations of writing both in the cache memory and in one of the disk memories of the mass memory.

DESCRIPTION OF THE PREFERRED EMBODIMENTS

Figure 1:
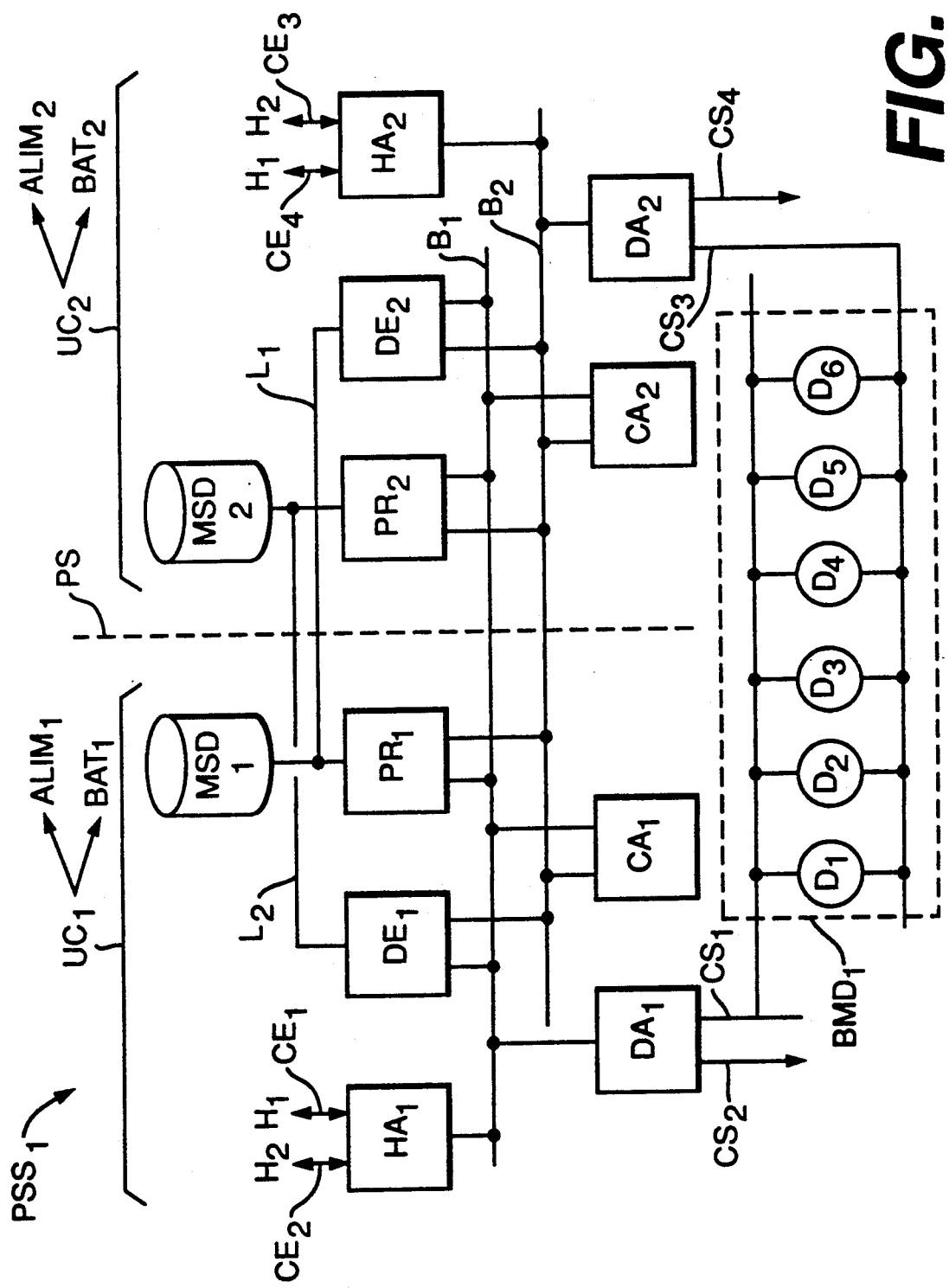
FIG. 1 shows a first exemplary embodiment of the hardware architecture of the peripheral subsystem according to the invention, in its simplest form.

Turning first to FIG. 1, a first exemplary embodiment $PSS_1$ of the peripheral mass memory subsystem of the invention is shown.

The subsystem $PSS_1$ belongs to a larger information processing system, for instance including two central hosts $H_1$ and $H_2$.

The subsystem $PSS_1$ preferably includes two identical control units, that is, $UC_1$ on the left and $UC_2$ on the right in FIG. 1.

The hardware architecture of the subsystem $PSS_1$ is constructed around two identical buses, preferably of the Multibus II type, that are parallel to one another, designated as $B_1$ and $B_2$. Buses $B_1$ and $B_2$ have a central zone in which they are fully facing one another, and two lateral zones where they do not face one another.

The two control units $UC_1$ and $UC_2$ are strictly identical and symmetrical to one another with respect to a plane of symmetry PS.

The first control unit $UC_1$ is supplied with electrical energy via a first power supply $ALIM_1$ and is connected to a first emergency electrical energy supply means embodied by a battery, that is, $BAT_1$.

Similarly, the second control unit $UC_2$ is supplied by a second power supply $ALIM_2$, which is independent of the first and is connected to a second emergency power supply $BAT_2$.

The first control unit $UC_1$ includes the following structural elements, a structural element being defined as the combination of a hardware structure and the microsoftware subassembly implemented on this structure:

- a first central processor $PR_1$;
- a solid-state disk unit $DE_1$;
- a host adaptor $HA_1$;
- a mass memory adaptor (which is formed of a bank $BMD_1$ having six disk memories $D_1$–$D_6$), that is, $DA_1$, which for simplicity is called a disk adaptor here;
- the backup disk memory $MSD_1$; and
- the cache memory $CA_1$.

Similarly, the second control unit $UC_2$ includes the second central processor $PR_2$, the second solid-state disk unit $DE_2$, the host adaptor $HA_2$, the second disk adaptor $DA_2$, the second backup disk memory $MSD_2$, and the second cache memory $CA_2$.

Figure 2:
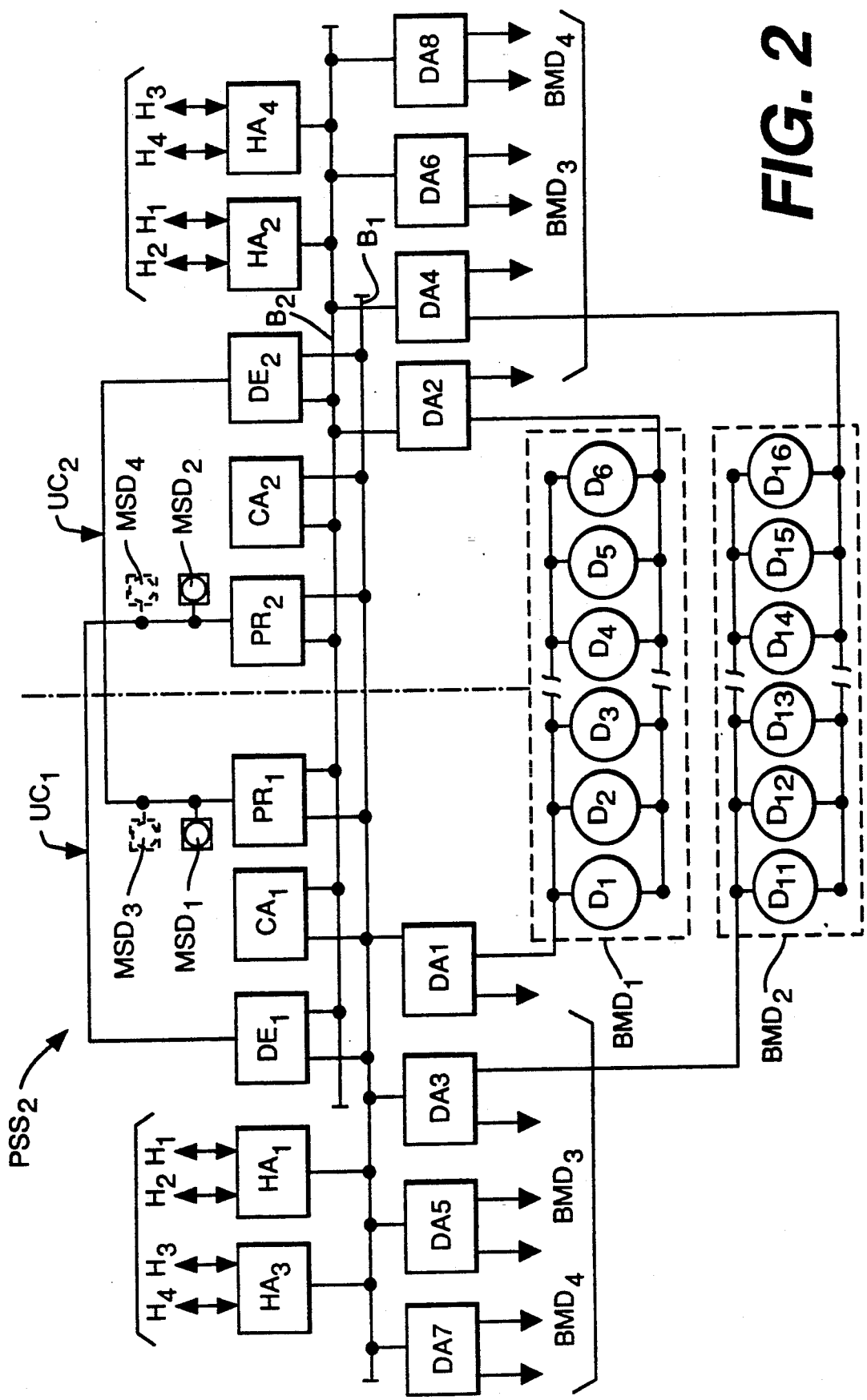
FIG. 2 shows a second exemplary embodiment of the hardware architecture of the peripheral subsystem of the invention, in one of its most complex forms.

The first and second disk adaptors $DA_1$ and $DA_2$ are connected by way of the respective links $CS_1$ and $CS_3$ to a disk memory bank $BMD_1$, only six of which are shown in FIG. 2, that is, the disk memories $D_1$–$D_6$. They may also be connected via links $CS_2$ and $CS_4$ to a second disk memory bank $BMD_2$, which is not shown in order to make FIG. 2 simpler.

The links $CS_1$–$CS_4$ are of the IPI-2 type, standardized by the American National Standards Institute (ANSI) and the International Standard Organization (ISO).

The first host adaptor $HA_1$ is connected by way of a first linking channel $CE_1$ to a first host $H_1$ and via a second linking channel $CE_2$ to a second host $H_2$.

Similarly, the second host adaptor $HA_2$ is connected to the second host $H_2$ by way of a first linking channel $CE_3$ and to the first host $H_1$ by way of a second linking channel $CE_4$.

In this case, the first linking channel $CE_1$ and $CE_3$ of the first and second host adaptors $HA_1$ and $HA_2$ have priority over the second linking channels $CE_2$ and $CE_4$.

The four linking channels $CE_1$–$CE_4$ are of the IPI-3 type standardized by ANSI (as well as by ISO).

All the structural elements constituting the first control unit, that is, $PR_1$, $DR_1$, $HA_1$, $DA_1$, $MSD_1$, and $CA_1$, are identical, from the standpoint of both hardware and microsoftware, to the corresponding elements of the second control unit $UC_2$—that is, $PR_2$ $DE_2$ $HA_2$ $DA_2$ $MSD_2$ and $CA_2$—and are symmetrical to them with respect to the plane PS.

The six constituent elements $DE_1$, $DE_2$, $PR_1$, $PR_2$, $CA_1$, $CA_2$ are connected simultaneously to the two buses $B_1$ and $B_2$ in the central part of the buses, where the buses face one another.

The constituent elements $HA_1$ and $DA_1$ of the first control unit $UC_1$ are connected to the first bus $B_1$, while the corresponding elements $HA_2$ and $DA_2$ of the second control unit $UC_2$ are connected to the second bus $B_2$.

The first backup disk memory $MSD_1$ is connected both to the first central processor $PR_1$ and to the second solid-state disk unit $DE_2$, via the SCSI-type link $L_1$.

Similarly, the second backup disk memory $MSD_2$ is connected to both the second central processor $PR_2$ and the first solid-state disk unit $DE_1$ via the SCSI-type link $L_2$. Thus the two backup disk memories $MSD_1$ and $MSD_2$ are accessible simultaneously to both the first and second control units $UC_1$ and $UC_2$.

The two backup disk memories are supplied with electric voltage by an OR circuit, the two inputs of which are connected to the power supplies $ALIM_1$ and $ALIM_2$, respectively (not shown for the sake of simplicity in FIG. 1.

The second exemplary embodiment of the peripheral mass memory subsystem according to the invention, $PSS_2$, shown in FIG. 2 is an expanded and more powerful version of the first example $PSS_1$ shown in FIG. 1. It is assumed to be likewise constructed around the two buses $B_1$ and $B_2$. It also includes two identical control units $UC_1$ and $UC_2$. Each of them includes the elements $PR_1$, $DR_1$, $CA_1$, $MSD_1$, $DA_1$, and $HA_1$ (for the unit $UC_1$) and $PR_2$, $DE_2$, $CA_2$, $MSD_2$, $DA_2$, and $HA_2$ (for the unit $UC_2$), which have exactly the same designation as the corresponding elements of FIG. 1 and the role and function of which are strictly identical. The disk memory bank $BMD_1$, composed of six disk memories $D_1$–$D_6$, is connected to the two disk adaptors $DA_1$ and $DA_2$ in the same manner as in FIG. 1.

The first control unit $UC_1$ further includes the host adaptor $HA_3$ and the three disk adaptors $DA_3$, $DA_5$, $DA_7$.

Similarly, the second control unit $UC_2$ further includes the host adaptor $HA_4$ and the three disk adaptors $DA_4$, $DA_6$ and $DA_8$.

The host adaptors $HA_1$ and $HA_3$ and the four disk adaptors $DA_1$, $DA_3$, $DA_5$ and $DA_7$ are connected to the bus $B_2$, while the host adaptors $HA_2$ and $HA_4$ and the disk adaptors $DA_2$, $DA_4$, $DA_6$, $DA_8$ are connected to the bus $B_1$.

It is understood that the other elements already mentioned, that is, the central processors $PR_1$, $PR_2$; the cache memories $CA_1$, $CA_2$; and the solid-state disk units $DE_1$, $DE_2$, are connected simultaneously to both buses $B_1$ and $B_2$.

The two disk adaptors $DA_3$ and $DA_4$ are connected to the disk memory bank $BMD_2$, embodied for example by six disk memories $D_{11}$ through $D_{16}$.

Similarly, the disk adaptors $DA_5$ and $DA_6$, on the one hand and $DA_7$ and $DA_8$, on the other, are respectively connected to further disk memory banks $BMD_3$ and $BMD_4$, embodied respectively by six disk memories, for example, $D_{21}$–$D_{26}$ and $D_{31}$–$D_{36}$, which are not shown in FIG. 2 for the sake of simplicity.

If the number of disk memories connected to the disk adaptors is sufficiently high, the control units $UC_1$ and $UC_2$ may further include additional backup disk memories, such as $MSD_3$ and $MSD_4$, which are respectively connected to the first central processor $PR_1$ and the second solid-state disk unit $DE_2$, on the one hand, and to the second central processor $PR_2$ and the first solid-state disk unit $DE_1$, on the other.

It will be appreciated that the peripheral subsystem of the invention may include further host adaptors and further disk adaptors besides those shown in FIG. 2, these additional disk adaptors being connected either to the other magnetic disk memory banks or, for example, to banks of optical disk memories, or tape drives, or magneto-optic disk memories. In other words, the peripheral mass memory subsystem of the invention may include a large number of possible configurations and can manage mass memories having a considerable memory capacity.

It is seen that each of the disk memories of the subsystem of the invention is of the dual-access type (via the host and disk adaptors of $UC_1$ or those of $UC_2$). Moreover, the fact that each of the units $UC_1$ and $UC_2$ is identical and is connected to the two buses $B_1$ and $B_2$ makes them interchangeable. As a result, if one of the structural elements of $UC_1$ is unavailable (for instance if it is entirely or partly defective, or because of maintenance, or replacement), it is the corresponding element of $UC_2$ that replaces it. Similarly, if one of the units $UC_1$ or $UC_2$ is unavailable (if the power supply goes out, or if maintenance is being done), the other unit acts as a relay. It is seen that the structure of the peripheral subsystem according to the invention (both hardware and microsoftware), having a double Multibus II and being perfectly redundant, assures both the complete protection of the data and the availability of the data to the central host $H_1$.

Figure 3:
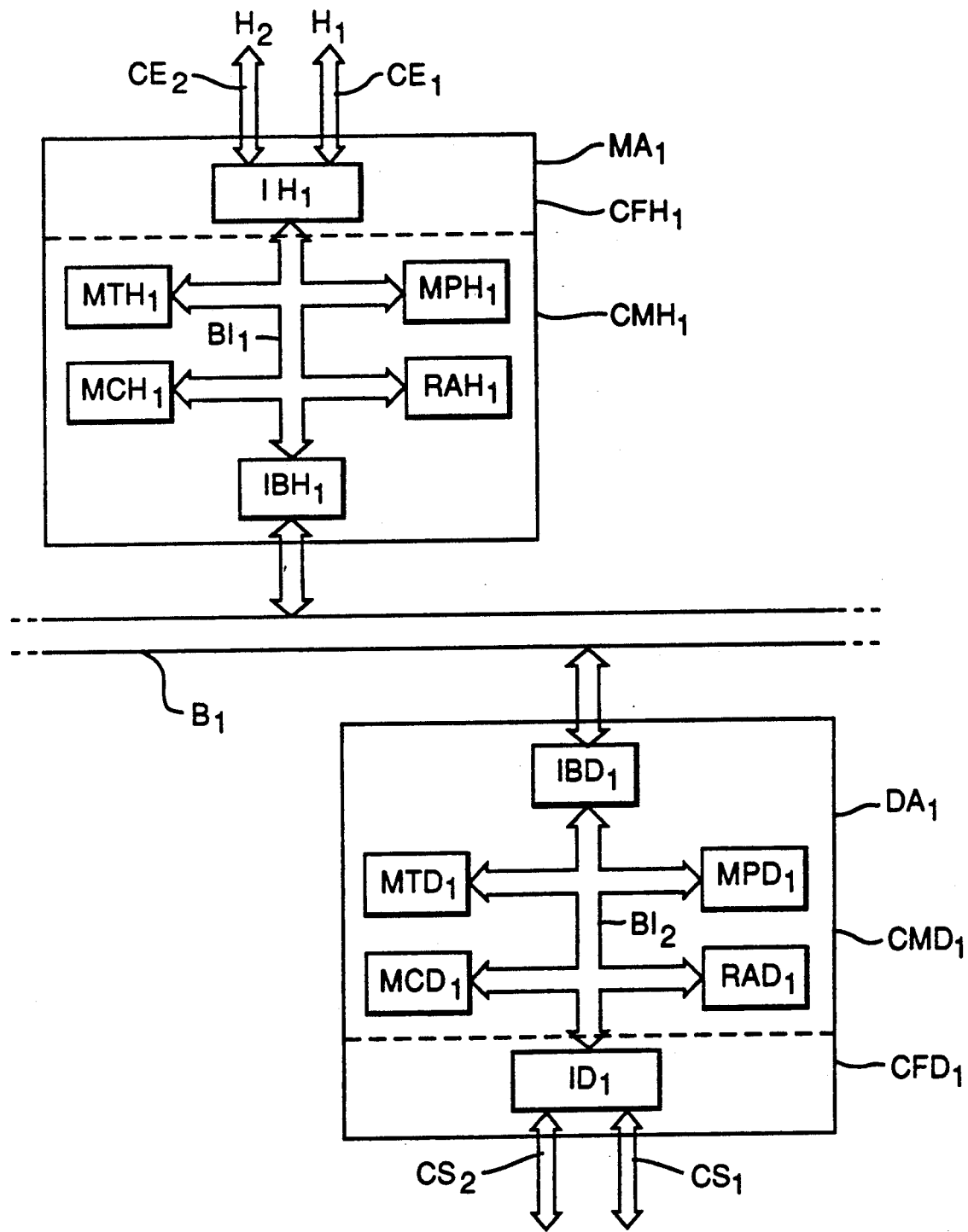
FIG. 3 shows the hardware structure of the host adaptors in greater detail and memory adaptors.

The more-detailed hardware structure of the host adaptors, such as $HA_1$, and disk adaptors, such as $DA_1$, is shown in FIG. 3. It is clear that the hardware structure of the adaptors $HA_2$–$HA_4$ and $DA_2$–$DA_8$, respectively, is entirely identical to the corresponding structure described below for $HA_1$ and $DA_1$.

The host adaptor $HA_1$ includes the following:

an interface $IH_1$, defined by the aforementioned IPI-3 standard, for linking to the central hosts $H_1$ and $H_2$ by way of the linking channels $CE_1$ and $CE_2$;

the host buffer memory, called the host buffer $MTH_1$ for simplicity, which in a preferred exemplary embodiment has a capacity on the order of 512 to 768 kilobytes;

the microprocessor $MPH_1$, for example an AMD 2900 microprocessor of the RISC type, that controls the function of the host adaptor;

the RAM memory, that is, $RAH_1$ associated with the microprocessor $MPH_1$, composed for example of one RAM-type memory intended to receive the various instructions of the microsoftware modules implemented in the host adaptor $HA_1$, and one RAM-type memory for the data, the two RAM-type memories, intended for the instructions and the data, respectively, each having a capacity of 256K, for example;

the microcontroller $MCH_1$ that assures the interconnection of the host adaptor with the other elements of the control units by way of the bus $B_1$;

the interface $IBH_1$ for connection with the Multibus II bus $B_1$, defined by the aforementioned IEEE Standard 1296, which for example is constituted by a VL 82c389 coprocessor (made by Intel) that communicates in the message mode with the other constituent elements of the peripheral subsystem $PSS_1$, $PSS_2$ of the invention.

All the constituent elements of the host adaptor listed above communicate with one another by the internal bus $BI_1$ of the microprocessor $MPH_1$.

The hardware structure of the disk adaptor $DA_1$ is similar to the hardware structure of the host adaptor $HA_1$.

Hence the adaptor $DA_1$ includes a connection interface $IBD_1$ for connection to the bus $B_1$, defined by the aforementioned IEEE Standard 1296; a buffer memory $MTD_1$ for the data intended to be written into the disk memories $D_1$–$D_6$ or deriving from the reading of the data inscribed in them, more simply called a disk buffer; the command microprocessor of the disk adaptor, that is, $MPD_1$; the interconnection microcontroller $MCD_1$; the RAM-type memory $RAD_1$ associated with the microprocessor $MPD_1$; and finally the interface $ID_1$ (defined by the aforementioned IPI-2 standard) for linkage with the disk memory banks $BMD_1$ via linking channels $CS_1$ and $CS_2$.

The hardware structure of the host adaptor and the disk adaptor $HA_1$ and $DA_1$ comprises a mother board and a daughter board.

Thus the host adaptor $HA_1$ includes the mother board $CMH_1$ and the daughter board $CFH_1$, while the disk adaptor $DA_1$ includes the mother board $CMD_1$ and the daughter board $CFD_1$.

The mother board $CMH_1$ includes the elements $MTH_1$, $MPH_1$, $RAH_1$, $MCH_1$, $IBH_1$, mentioned above, and the mother board $CMD_1$ includes the elements $MCD_1$, $MTD_1$, $RAD_1$, $MPD_1$ and $IBD_1$.

The daughter board $CFH_1$ includes the interface $IH_1$, while the daughter board $CFD_1$ includes the interface $ID_1$.

It is seen that the two mother boards $CMH_1$ and $CMD_1$ are strictly identical, and consequently the host and disk adaptors $HA_1$ and $DA_1$ do not differ in hardware except in their daughter boards $CFH_1$ and $CFD_1$. The mother boards $CMH_1$, $CMD_1$ are of the mono-Multibus II type, in the sense that they can be connected to a single bus of the Multibus II type, such as $B_1$.

Figure 4:
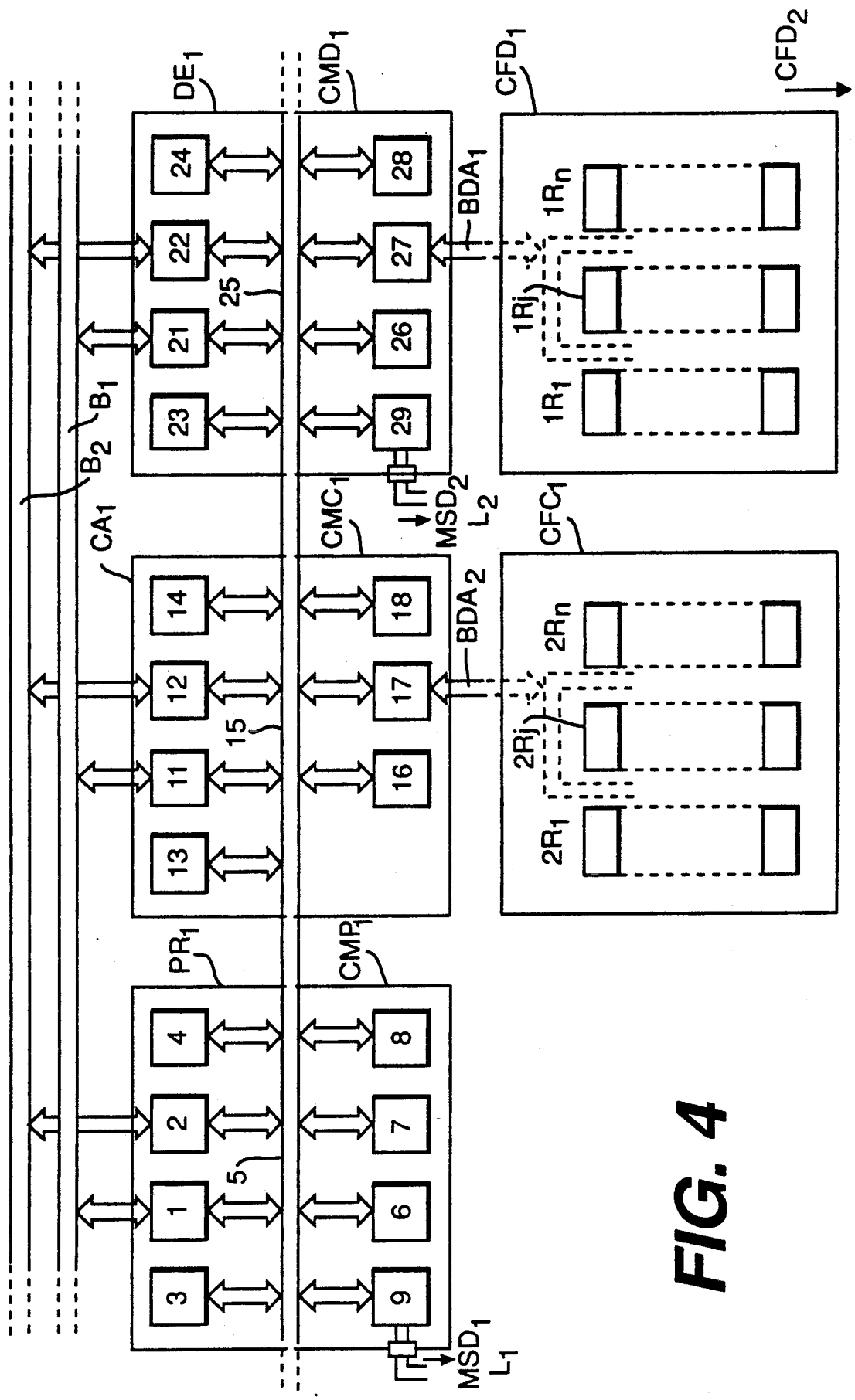
FIG. 4 shows the hardware structure of the central processor, the cache memory, and a solid-state disk unit of one of two control units of the peripheral subsystem of the invention in greater detail.

The hardware structure of the various structural elements $PR_1$, $CA_1$, $DE_1$, of the control unit $UC_1$, are shown in FIG. 4.

Each of these elements $PR_1$, $CA_1$, $DE_1$ is formed of a mother board, that is, $CMP_1$, $CMC_1$, and $CMD_1$, respectively, and in the case of $CA_1$ and $DA_1$, at least one daughter board, that is, $CFC_1$ and $CFD_1$.

The various mother boards $CMP_1$, $CMC_1$ and $CMD_1$ have an identical hardware structure.

Thus the mother board $CMP_1$ includes the hardware components 1-8, all of them connected to the internal bus 5; the mother board $CMC_1$ includes the hardware components 11-18, all connected to the internal bus 15; and the mother board $CMD_1$ includes the hardware components 21-28, all connected to the internal bus 25.

The hardware components 1-8, 11-18 and 21-28 are identical to one another respectively and in the order indicated above. That is, the elements 1, 11 and 21 are identical to one another; the elements 2, 12, 22 are identical; and so forth. Thus in order to know the hardware components 11-18 and 21-28, it is sufficient to describe the hardware components 1-8.

The components 1 and 2 are interfaces for communication with the buses $B_1$ and $B_2$, of the same type as the interfaces $IBH_1$ and $IBD_1$ described above.

The two components 3 and 4 are microcontrollers for interconnection with the other constituent elements of the peripheral subsystem by way of the buses $B_1$, and $B_2$. These are components, for example in the form of Intel 80c32-type microcontrollers, of the same type as the microcontrollers $MCH_1$ and $MCD_1$ described above.

Component 6 is the command microprocessor of all the components comprising the central processor $PR_1$. It comprises an AMD 2900 microprocessor of the RISC type and consequently is identical to the microprocessors $MPH_1$ and $MPD_1$ described above.

Component 7 is a buffer memory, the capacity of which is between 512 and 768K (identical to $MTD_1$ and $MTH_1$), while component 8 is a RAM-type memory, identical to the memories of the same type described above in conjunction with FIG. 3, that is, $RAH_1$, and $RAD_1$. Hence the component 8 is embodied by one RAM-type memory containing the instructions of the various microsoftware modules that the central processor $PR_1$ includes, and one RAM-type memory for the data that are processed by the microprocessor 6.

The mother boards $CMP_1$, $CMC_1$, $CMD_1$ are mother boards of the bi-Multibus II type.

The mother board $CMP_1$ of the central processor $PR_1$ also includes the hardware component 9, which is an interface with the link $L_1$ that connects the central processor and $DE_2$ to the backup disk memory $MSD_1$. The interface 9 is accordingly of the standardized IPI-2 type.

Similarly, the mother board $CMD_1$ of the solid-state disk unit includes the component 29, which interfaces with the link $L_2$ connecting $PR_2$ and $DE_1$ to $MSD_2$.

The daughter board $CFD_1$ of the solid-state disk unit $DE_1$ comprises the memory plane of this unit and for example includes a plurality of columns of RAM memory, such as the columns $1R_1, \ldots, 1R_j, \ldots, 1R_n$.

The information (data and addresses where the data are located within the RAM of the memory plane $CMD_1$) originating from or proceeding to this memory plane $CFD_1$ are transported over a bus $BDA_1$, which is subdivided into a sufficient number of branches to supply all the RAM memory columns of which memory plane (in the case where the solid-state disk unit would include a second memory plane, it would be constituted by a second daughter board $CFD_2$ connected to the first daughter board $CFD_1$ by a bus of the same type as $BDA_1$).

The daughter board $CFC_1$ of the cache memory $CA_1$ is identical to the daughter board $CFD_1$.

This daughter board $CFC_1$ comprises the memory plane of the cache memory $CA_1$ and is embodied by a plurality of parallel RAM-type columns, that is, $2R_1, \ldots 2R_j, \ldots, 2R_n$, the set of these columns being connected to the buffer memory 17 of the mother board $CMC_1$ by way of the bus (data and address bus) $BDA_2$.

It is accordingly clear that the hardware architecture of the peripheral subsystem according to the invention is generally constructed around only two types of mother boards, one for the host and disk adaptors, and the other for the central processors, cache memories, and solid-state disk units. One or more daughter boards of different types, depending on the function assured by each of these elements, is associated with each of these two types of mother boards.

It will be appreciated that this extremely simple structure, together with the fact that the set of elements connected to one or the other bus of the Multibus II type are disposed inside the same board holder magazine or card cage, is extremely economical. Moreover, it can be assembled extremely rapidly during manufacture.

Figure 5:
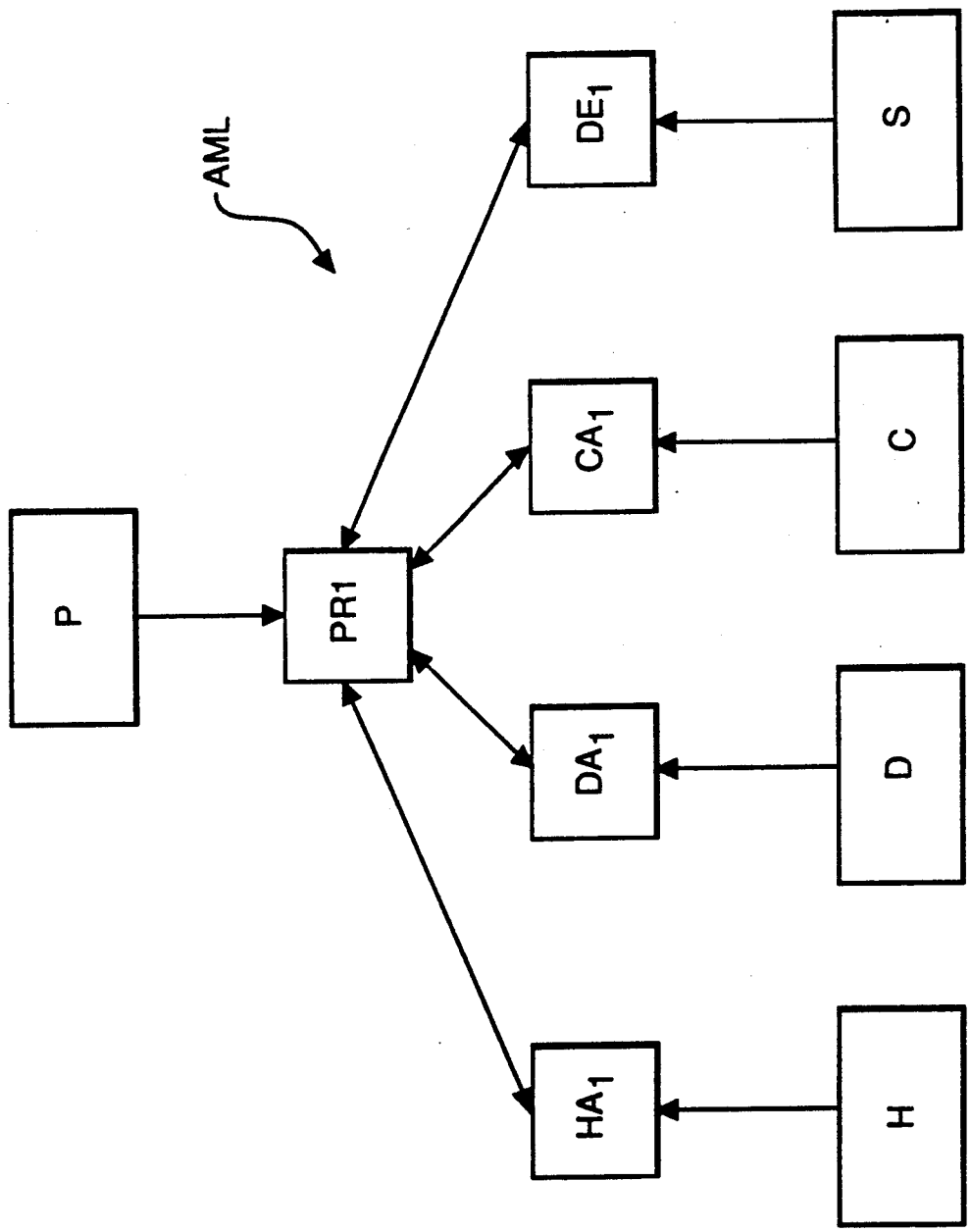
FIG. 5 shows how the various functional subassemblies of the microsoftware architecture are connected to each of the hardware elements comprising a control unit of the peripheral subsystem of the invention.

Turning now to FIG. 5, the microsoftware architecture AML of the peripheral subsystem of the invention includes five large microsoftware subassemblies, that is, the subassemblies P, H, D, C, S, which are implemented respectively in the hardware structures of $PR_1$, $HA_1$ ($HA_2$-$HA_4$), $DA_1$ ($DA_2$-$DA_8$), $CA_1$ ($CA_2$), and $DE_1$ ($DE_2$).

Each subassembly is composed of a certain number of modules each having a particular function. Certain modules are identical from one subassembly to another.

The modules of the same subassembly communicate with one another either by way of common memory zones disposed in the RAM memories, such as $RAH_1$, $RAD_1$, 8, 18, 28, or by direct calling between one another.

The modules belonging to different subassemblies communicate with one another by way of Multibus II messages, as defined by the IEEE standards defining the Multibus II; these messages are prompted messages for the data, and nonprompted messages for the requests, responses and notifications.

Aside from the five microsoftware subassemblies shown in FIG. 5, there is another subassembly that is common to all the hardware structures and that relates to the microcontrollers contained in each of them, that is, the microcontrollers $MCH_1$, $MCD_1$, 3, 4, 13, 14, 23, 24. This microsoftware subassembly is assigned reference symbol MIC. It includes the following modules:

the module $m_1$, assigned to initialize the set of hardware components of each of the structural elements $HA_1$-$GA_4$, $DA_1$-$DA_8$, $PR_1$, $PR_2$, $CA_1$, $CA_2$, $DE_1$, $DE_2$. This initialization refers more particularly to various tests of these hardware components at the time the two control units $UC_1$ and $UC_2$ are powered up. These tests are better known in current practice by their English symbols, that is, BIST and BOOT;

the interconnection module $m_2$, also known by the English term "interconnect space", which relates to the interconnection of the various hardware structures at the time the two control units are powered up, and which in turn is defined by the aforementioned IEEE Standard 1296 relating to the Multibus II;

the module $m_3$ for management of the wire connection, of the standardized RS 232 type, a link that connects each of the control units to the two power supplies $ALIM_1$ and $ALIM_2$ (these links are not shown, for simplicity, in FIGS. 1-3).

The subassembly H includes the following modules:

the module $M_0$ relates to the operating system of the host adaptor. As will be seen below, this module $M_0$ is common to the subassemblies P, H, D, C, S. This module organizes the work of linkage between the various modules that comprise the subassembly of which it is a part, in this case H, by assuring the passage from one to another;

the module $M_1$ for managing the transfer of information (data, addresses) common to the subassemblies P, H, D, C, S. It assures the transfer of information from the hardware element where it is implemented, in this case H, to the others by way of one or the other of the Multibus II buses ($B_1$, $B_2$);

the module $M_2$ for management of the host interface $IH_1$ of the host adaptor $HA_1$. It is understood that this module is common to all the host adaptors $HA_1$-$HA_8$;

the module $M_3$ for management of the stack of commands contained in the instruction RAM of the memory $RAH_1$. It is common to the other subassemblies H, D, S;

the module $M_4$ for execution of commands addressed to the control units $UC_1$ and $UC_2$, by the host $H_1$;

the module $M_5$ for reception of commands originating in the central host $H_1$ and intended for the disk memories of the bank $BMD_1$, for example, and for routing these commands to the disk adaptor $DA_1$;

a retry module $M_6$ for processing when an error is detected in one or the other of the hardware components of the host adaptor. This module is common to the subassemblies H, D and S;

the supervision and administration module $M_7$, which for instance works with statistics, assures the linkage between the module $m_2$ (see above), the saving of context, for example in the case of a power outage for the control unit to which the host adaptor belongs, table initialization, etc. This module is common to the subassemblies H, D and S;

the module $M_{10}$ for management of the host buffer memory $MTH_1$.

The subassembly D implemented in the host adaptor $DA_1$ includes the following modules:

the module $M_0$ defined above;

the module $M_1$ for management of the Multibus II transfers, also defined above;

the module $M_3$ for managing the command stack, defined above;

the module $M_{10}$ for managing the buffer memory $MTD_1$ (see above);

the retry module $M_6$, already defined above;

the supervision and administration module $M_7$, defined above;

the module $M_9$ for interpreting commands of the central host to one or the other of the disk memories of the bank $BMD_1$.

The microsoftware subassembly S of the solid-state disk units $DR_1$ and $DE_2$ is strictly identical to the microsoftware subassembly D.

The microsoftware subassembly C of the cache memories $CA_1$, $CA_2$, includes the following modules:

the module $M_0$ (see above)

the module $M_1$ for managing the transfer of information over one or the other of the Multibus II buses (see above);

the module $M_{11}$ for managing the tables that the cache memories $CA_1$, $CA_2$ include.

The microsoftware subassembly P implemented in each of the two central processors $PR_1$ and $PR_2$ includes the following modules:

the module $M_0$ relating to the operating systems (see above);

the module $M_1$ for managing the Multibus II transfers (see above);

the initialization module $M_{12}$ for the corresponding control unit ($UC_1$, $UC_2$);

the module $M_{13}$ for communication between the two control units, which is charged in particular with establishing the exchanges of information between these two control units, such that when one of the structural elements of one is unavailable, the corresponding structural element of the other is then assigned to perform the operations normally performed by the unavailable element;

a module $M_{14}$ for managing the power supply $ALIM_1$ ($ALIM_2$), and a maintenance panel intended for any human user charged with maintenance of the peripheral subsystem according to the invention;

a module $M_{16}$ for salvaging the context of the entire corresponding control unit in the case of a power outage;

a module $M_{17}$ for restarting either writing or reading operations in the solid-state disk unit $DR_1$, $DE_2$ after a power outage, accompanied with corresponding saving of context by the aforementioned module $M_{16}$, has taken place;

the module $M_{18}$ for managing the interface between the backup disk memory $MSD_1$ ($MSD_2$) and the central processor, that is, $PR_1$, with which it is associated.

The manner in which each of the above-defined microsoftware subassemblies works, and the manner in which each of these modules that make them up act in connection with the others will be better understood from the ensuing description, in particular in conjunction with FIGS. 7A, 7B, 8A and 8B, relating to the operations inside the disk memory banks $BMD_1$ and cache memories $CA_1$, $CA_2$.

The description will begin first by defining the broad outlines of the role of the subassembly P of the central processor $PR_1$ ($PR_2$).

The two central processors $PR_1$ and $PR_2$ are the respective prime contractors of the various hardware elements belonging to each of the control units $UC_1$ and $UC_2$. They load the implementation programs of the various elements $HA_1$-$HA_8$, $DA_1$-$DA_8$, $DE_1$, $DE_2$, $CA_1$, $CA_2$ inside them, to enable them to perform the functions assigned to them. Naturally these implementation programs correspond to the functional subassemblies H, D, C, S described above. The processors $PR_1$ and $PR_2$ look for these programs, which are stored for example in the backup rotary disk memories $MSD_1$ and $MSD_2$. In that case, these backup memories have a dual function, that is, first to back up the information not yet stored and waiting to be written into the rotary disk memories of the banks $BMD_1$, $BMD_2$, and so forth, in the event that the adaptors $DA_1$, $DA_2$, and so forth are unavailable, and second to store the aforementioned implementation programs. However, these latter programs can be stored in a special disk memory, called a system disk memory, which is connected to both the processor $PR_1$ and the processor $PR_2$. In the ensuing description it will be assumed that the backup rotary disk memories $MSD_1$ and $MSD_2$ also play the role of system disk memories.

The initialization of the peripheral mass memory subsystem of the invention proceeds as follows:

Each control unit ($UC_1$, $UC_2$) boots up and configures itself autonomously upon being powered up. Booting (that is, the implementation of the various microsoftware subassemblies in each of the hardware structures of the structural elements comprising the control unit) is done from a file in the backup disk memory (since it plays the role of a system disk memory). The initialization comprises executing the following operations successively:

For each of the hardware structures, the microcontroller $MCH_1$, $MCD_1$, 3, 4, 13, 14, 23, 24 executes the instructions of the module $m_1$ and initializes their hardware components.

During this time, the hardware structure of $PR_1$ boots from the disk memory $MSD_1$, while the other hardware structures of the other structural elements wait to be loaded with their own microsoftware subassembly. In other words, the central processor $PR_1$ is loaded, in its RAM memory 8, by the modules $M_0$, $M_1$, $M_{12}$, $M_{13}$, $M_{14}$, $M_{15}$, $M_{16}$ and $M_{17}$.

Next, the processor $PR_1$ sends a loading code to each of the other hardware structures comprising the control unit $UC_1$. It then sends them the microsoftware subassemblies corresponding to them (which it has looked for in the backup disk memory $MSD_1$ and has stored, for example in its buffer memory 7), via one or the other of the two buses of the Multibus II type.

Each of the elements ($DE_1$, $CA_1$, $HA_1$, $DA_1$) initializes its hardware components by executing each of the modules $m_0$, $m_1$, $m_2$, $m_3$, by means of the microcontrollers that it includes. It then loads the various modules comprising the microsoftware subassembly that it implements.

If the backup disk memory, in its function as a system disk memory, is not accessible by the central processor $PR_1$ for any reason whatever, this central processor is loaded by the central processor $PR_2$ of the other control unit $UC_2$. Once loaded, $PR_1$ looks for the file for loading the microsoftware subassemblies of the structural elements of the control unit $UC_1$ in the other disk memory $MSD_2$, acting as the system disk memory for $UC_2$.

As soon as each of the hardware structures of a control unit has been loaded with all the modules comprising the microsoftware subassembly that corresponds to it, the structural element thus formed can execute the functions assigned to it.

Figure 7A:
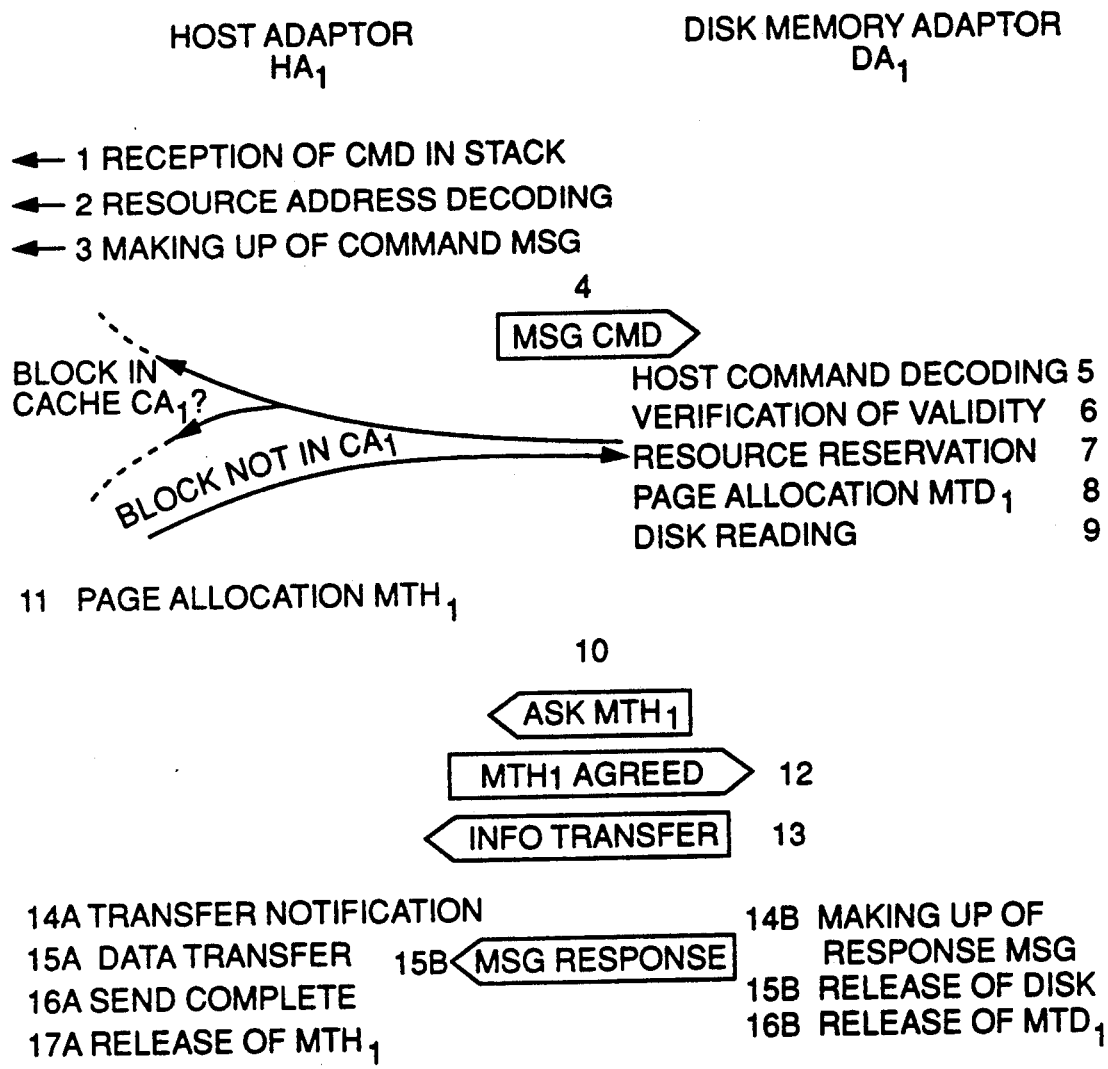
FIGS. 7A and 7B, is a flow chart of the dialog between the host adaptor and the disk memory adaptor, on the one hand, and between the host and disk adaptors and the cache memory on the other hand, which makes it possible to implement the operations of reading a block of data both in the cache memory and in one of the disk memories of the mass memory.
Figure 7B:
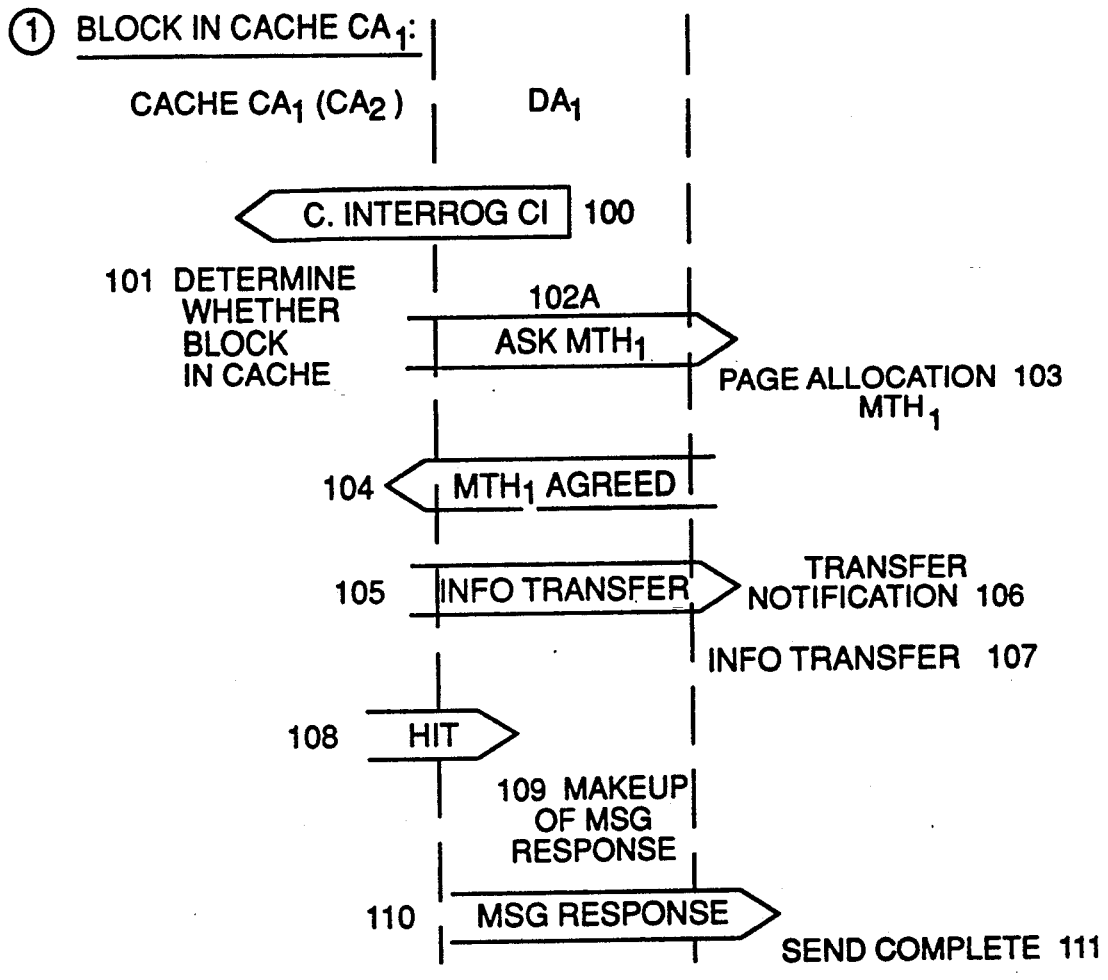

To better illustrate the manner in which a microsoftware subassembly works, see first FIGS. 7A and 7B, which show how the operations of writing information within the disk memories of a bank, such as $BMD_1$, are performed by each of the microsoftware modules comprising the subassemblies H, D and C, which are loaded in $HA_1$, $DA_1$ and $CA_1$.

Figure 6:
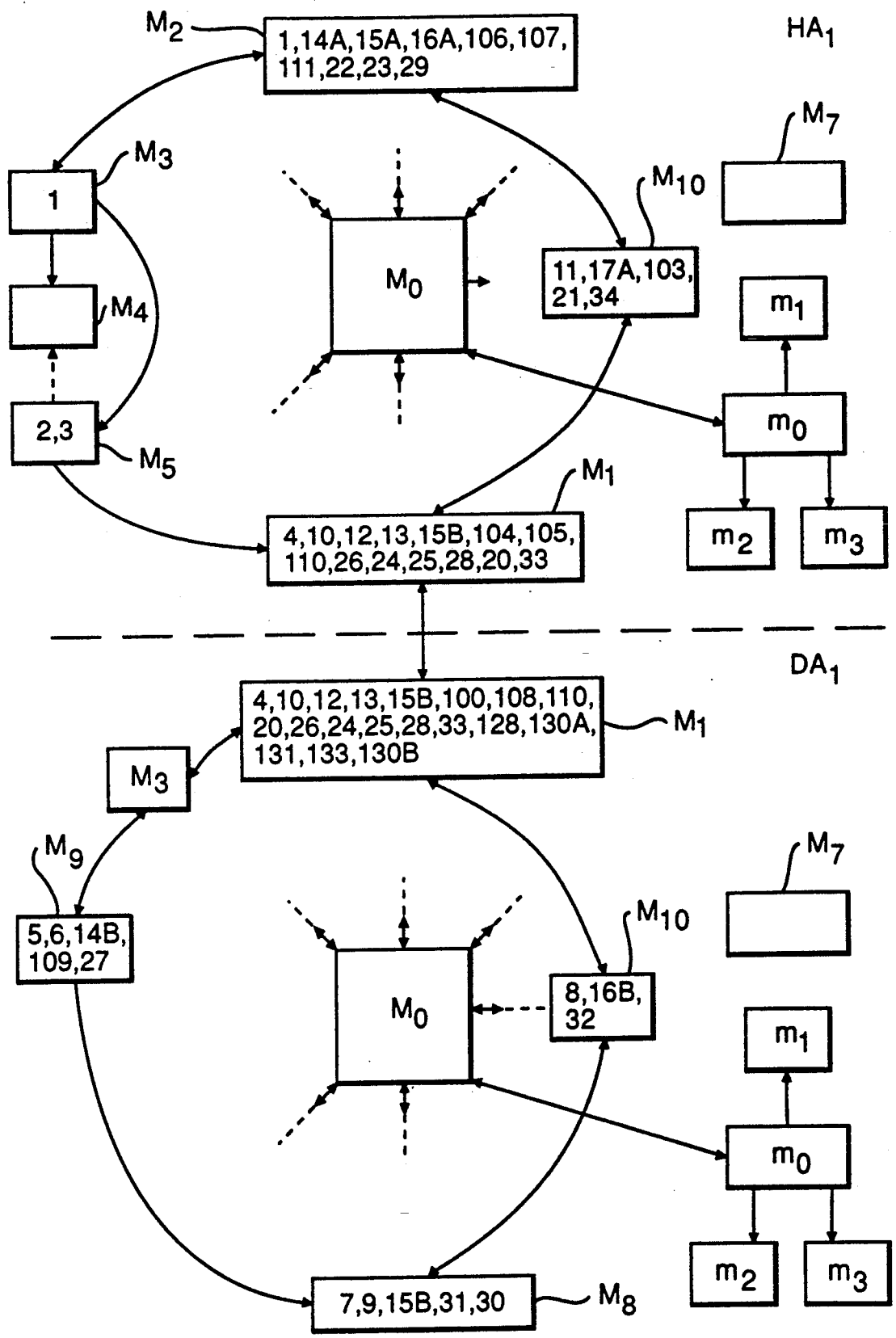
FIG. 6 shows the respective composition of the functional subassemblies of the microsoftware architecture that are specific to the host adaptors and memory adaptors.

Turning also to FIG. 6, this drawing shows how the modules of the software subassemblies implemented in $HA_1$ and $DA_1$ function with respect to one another, and also shows the various operations performed by each of these modules when a block of data is read both in one of the disk memories of the bank $BMD_1$ (or $BMD_2$, etc) and in the cache memory $CA_1$ ($CA_2$).

Before the various operations that ensue at the time a block of data is read in one of the disk memories $D_1$-$D_6$ of $BMD_1$ and in the cache memory $CA_1$ are described, it is appropriate first to review how the information is written in a disk memory and the role of a cache memory.

To write a block of data on a magnetic disk of a disk memory, the disk memory is divided into sectors, each of the same length. This usage is conventional at present in disk memories known as fixed-format memories. The various sectors all contain the same number of bytes (512K, for example). In each sector, a header, a data block and a footer are written in succession. The header contains the information on the physical location of the sector on the track of the magnetic disk where it is located, and the footer contains the information for verifying the integrity of the data, to verify whether all the bytes recorded in this sector are correct. This kind of sector organization for writing information, and its distribution within sectors, is quite well known and is currently used in conventional disk memories. In the peripheral subsystem of the invention, this writing organization is also used in the solid-state disk units DE1 and DE2.

It will be appreciated that in the course of the operations relating to a disk memory, the same block of data is frequently read. In other words, the probability of access to the same data blocks over time is quite high. Additionally, in the case where a plurality of data blocks is read sequentially, the probability that, once a first predetermined data block has been read, the same data blocks will always be read following this same predetermined block is also high.

Because of the situation described above, cache memories are used, which contain precisely the data having the highest probability of being read quite often. These data are accordingly read directly in the cache memory; there is no need to look for them in the corresponding disk memory.

They are then read with the access time of the cache memory, which is quite substantially shorter than the access time of magnetic disk memories (on the order of a tenth of a millisecond, compared with several tens of milliseconds).

Within a cache memory $CA_1$, the information is written in RAM memory columns $2M_1, \ldots, 2M_j, \ldots, 2M_n$ of the daughter board $CFC_1$, in the form of blocks that are called cache blocks. In the same manner as each sector of a disk memory, each of them includes a header, followed by data, which are typically said to be a data field, and that is in turn followed by a footer. The respective roles of the header and footer are the same as that of the header and footer of the sectors of data recorded in the magnetic disk memories.

A data field of a single cache block corresponds to all the data recorded in N (an integer) sectors of a magnetic disk of a disk memory belonging to one of the banks $BMD_1$, $BMD_2$, and so forth.

The correspondence between each cache block and the various corresponding sectors of a given magnetic disk belonging to a given disk memory is indicated in a table. It occupies the memory spaces of the RAM memory 18 belonging to the mother board $CMC_1$, for instance.

Turning now to FIGS. 7A and 7B, the dialog between the host adaptor $HA_1$ and the disk adaptor $DA_1$, on the one hand, between the disk adaptor and the cache memory, on the other, and finally between the cache memory and the host adaptor $HA_1$, is shown, at the time of reading of a block of data in any of the disk memories of the bank $BMD_1$, whether or not some of the data are read in the cache memory $CA_1$.

The reading operations are as follows:

1) The host adaptor $HA_1$ receives a reading request from the host $H_1$, for example, in the form of a command message CMD, which is sent in a stack of commands located for example in the memory $RAH_1$. This operation is performed successively by the modules $M_2$ and $M_3$.

2) Within the command message CMD, the module $M_5$ decodes the address of the disk memory in which the data block is to be read. This disk memory will be called the resource, for the sake of simplicity.

3) As soon as the module $M_5$ has decoded the address of the resource, it makes up a command message, symbolized by MSG CMD.

4) This message MSG CMD, which is in fact a message of the Multibus II type, is sent over the bus $B_1$ to the disk adaptor $DA_1$, under the direction of the module $M_1$.

5) It is decoded by the microprocessor $MPD_1$ under the direction of the module $M_9$.

6) The latter verifies its validity.

The module $M_9$ performs the reservation of the resource where the host $H_1$ wishes to read the data block in question. Once the resource has been reserved, operation 100 ensues.

100: Under the direction of the module $M_1$, the disk adaptor sends an interrogation command CI to the processor 16 of the cache memory $CA_1$. The purpose of this command is to learn whether the data block is memorized in the RAM memories of the daughter board $CFC_1$.

101: The module for management of the table of the cache memory, that is, $M_{11}$, makes a search in the table of the cache memory to learn whether the data block in question is located there.

A) It will be assumed first that the response is positive.

A dialog is established then between the cache memory $CA_1$ and the host adaptor $HA_1$. This dialog includes the following operations 102A-111.

102A: The module $M_1$ of the cache memory $CA_1$ sends a request to reserve pages in the buffer memory $MTH_1$ to the host adaptor.

103: The management module $M_6$ of the host adaptor then allocates the pages of the buffer memory $MTH_1$ for temporary memorization there of the data block that is to be read in the cache memory $CA_1$. As soon as the page of buffer memory has been allocated, the operation 104 ensues.

104: The host adaptor, under the direction of the module $M_1$, sends a message to the cache memory via the bus $B_1$, indicating that the pages of its buffer memory $MTH_1$ have been assigned.

105: The data block read in the cache memory is transferred to the buffer memory $MTH_1$, under the direction of the module $M_1$ of the cache memories and of the host adaptor.

106: As soon as all the data of the block have been memorized in the buffer memory $MTH_1$, the host adaptor notifies the host $H_1$ that it will be transferring the data block in question to the host. This notification is done under the direction of the module $M_2$.

107: As soon as the host $H_1$ has accepted the transfer, the transfer is performed by the host adaptor, under the direction of the module $M_2$.

108: While the operations 106 and 107 are being performed, the cache memory sends a signal $H_1T$ to the disk adaptor $DA_1$, indicating to it that the data block in question has been transferred from the cache memory to the host adaptor $HA_1$. This message HIT is sent from the cache memory $CA_1$ to the disk adaptor $DA_1$ by the module $M_1$ of the cache memory.

109: As soon as the disk adaptor has received the message HIT, it makes up a response message MSG REP, under the direction of the module $M_9$.

110: The disk adaptor then sends the response message MSG REP to the host adaptor $HA_1$, under the direction of the module $M_1$ of the disk adaptor and host adaptor.

111: As soon as the host adaptor has received the response message MSG REP, then under the direction of its module $M_2$ it sends a signal called a completion transmission, indicating to the host $H_1$ that the operation of reading the data block in the cache $CA_1$ has been completed.

B) If the response is negative

Operation 101 (see above) is then followed by operation 102B.

102B: The cache memory $CA_1$, by way of its module $M_1$, sends a message via the bus $B_1$ to the disk adaptor $DA_1$, indicating that the data block is not found there. Following the reception of this message by $DA_1$, the next operation 8 is performed.

8) The adaptor $DA_1$ allocates one or more pages of its buffer memory $MTD_1$ for reception there of the data block that will be read in the resource (operation performed by the module $M_{10}$). One then proceeds to the next operation.

9) Under the direction of the module $M_8$, the reading of the data block in the resource is performed.

10) As soon as the reading is completed, the data block being instantaneously memorized in the allocated pages of the buffer memory $MTD_1$, the adaptor $DA_1$ sends a request for allocation of pages of its buffer memory $MTH_1$ to $HA_1$, under the direction of the module $M_1$.

11) In response to this request, $HA_1$ allocated pages in its buffer memory $MTH_1$ with a view to receiving the data block in question.

12) $HA_1$ sends a message to $DA_1$, via the bus $S_1$, signifying that one or more pages of $MTH_1$ have been assigned (module $M_1$ of $HA_1$ and $DA_1$).

13) $DA_1$ then, in response to this last message, organizes the transfer of information read in the resource to $HA_1$, under the direction of the modules $M_1$ of these two adaptors.

14A) The host adaptor, under the direction of the module $M_2$, then notifies the host $H_1$ of the immediate transfer of the data block that has been read in the resource and has been temporarily stored in the buffer memory $MTH_1$.

14B) While operation 14A proceeds, the disk adaptor makes up a response message MSG REP. This is sent (operation 15B) to $HA_1$, under the direction of the modules Ml of the disk adaptor and host adaptor. When $HA_1$ receives this response message, it performs the operation 15A.

15A) It then transfers the data block to the host $H_1$, under the direction of the module $M_2$. During this time, $DA_1$ performs operations 15B and 16B.

15B) The disk adaptor, by way of the module $M_8$, releases the resource, and then, under the direction of the module $M_{10}$, releases the buffer memory $MTD_1$ (operation 16B).

16A) As soon as the host adaptor has completed the transfer of the data to the host $H_1$, it sends the host a completion transmission signal, indicating that all the operations of reading the data block in the resource have been completed (module $M_2$).

17A) The host adaptor releases $MTH_1$ then, under the direction of its module $M_{10}$.

Figure 8B:
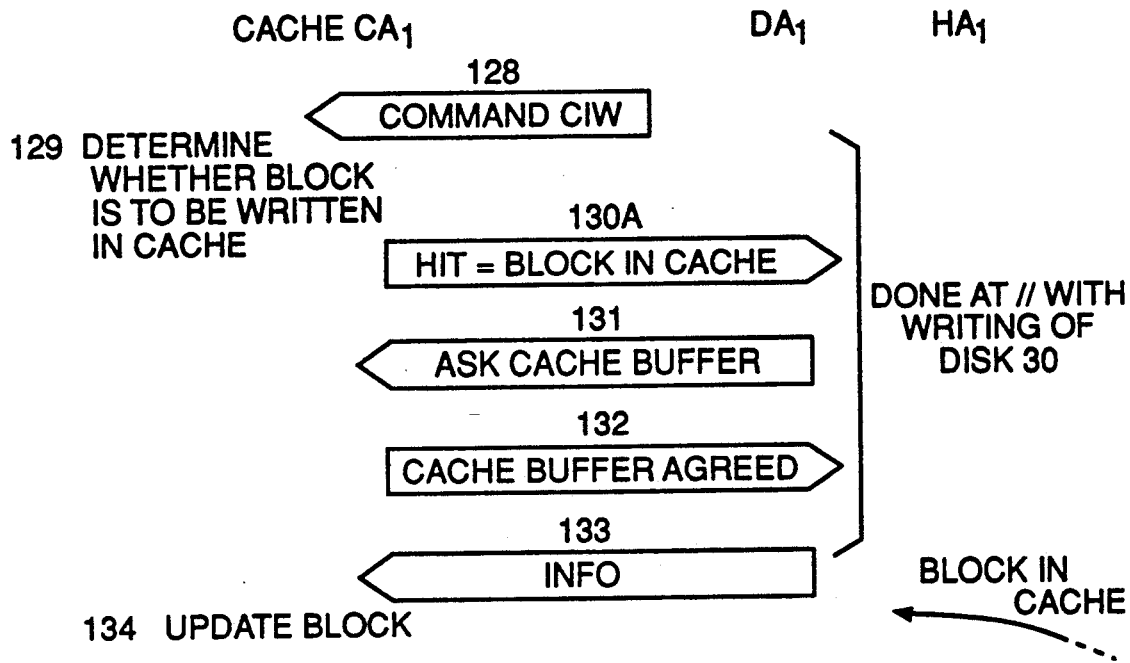

Turning now to FIGS. 8A and 8B, these show all the operations performed for writing a block of data, either in the cache memory $CA_1$ or in the one of the disk memories of a bank such as $BMD_1$, $BMD_2$, and so forth.

The set of operations 1–8, which relates to the dialog between $HA_1$ and $DA_1$, is strictly identical to the set of operations 1–8 that has been described above in relation to FIGS. 7A and 7B for the reading of a block of data in a resource or in the cache memory $CA_1$. The next step is operation 20:

20) The disk adaptor $DA_1$ sends a message over the bus $B_1$ to the host adaptor $HA_1$, to request it to transfer the data block to be written. This operation takes place under the direction of the two modules $M_1$ of the two adaptors.

21) The host adaptor then allocates one or more pages of the host buffer memory $MTH_1$, for the sake of receiving the data block there (module $M_{10}$).

22) $HA_1$ then notifies the central host $H_1$ that the central host is to transfer the data block to be written (module $M_2$).

23) The central host then transfers the data block to be written, under the direction of the module $M_2$, the data block having been memorized temporarily in the pages of buffer memory allocated in operation 21.

24) $HA_1$ then sends a message to $DA_1$ asking it to allocate one or more pages of its buffer memory $MTD_1$, for later reception there of the data block to be written (modules $M_1$ of the two adaptors).

25) In response to this message, $DA_1$ sends a message indicating to $HA_1$ that one or more pages of $MTD_1$ have been assigned (modules $M_1$).

26) $HA_1$ then transfers the data block to be written to $DA_1$, which temporarily memorizes it in the previously allocated pages of $MTD_1$.

27) Upon reception of the data block to be written in $MTD_1$, $DA_1$ makes up a response message MSG REP (module $M_9$). It sends it to $HA_1$ (operation 28) under the direction of the modules $M_1$.

29) When $HA_1$ receives the message MSG REP, it sends the host a completion of transmission signal, under the direction of the module $M_2$. To the host $H_1$, this message means that the operation of writing the data block has been completed, while in reality it has not yet taken place, either in the reserved resource or in the cache memory $CA_1$.

Step 30 then follows.

30) Under the direction of the module $M_8$, the adaptor $DA_1$ organizes the writing of the data block in the resource in question. Parallel to this writing, the disk adaptor, under the direction of its module $M_1$, sends a command signal CIW to the cache memory $CA_1$, over one or the other of the two buses $B_1$, $B_2$. The purpose of this signal is to ask the cache memory whether the data block to be written can be written in the memory $CFC_1$ thereof. Sending of the command signal CIW is the subject of operation 128.

129: In response to 128, the cache memory, under the direction of the module $M_{11}$, then sends the disk adaptor a signal HIT or $\overline{HIT}$ signifying in the first case that the data block is to be written in the cache memory and in the second that this is not so (operation 130A in the first case, and 130B in the second). It is clear that in the second case, in response to the operation 130B, the disk adaptor will henceforth ignore the memory cache $CA_1$. In the first case (130A), the procedure continues to operation 131.

131: The disk adaptor sends the cache memory a message requesting the reservation of one or more pages of the cache buffer memory 17, for temporary storage there of the data block to be written before it is written in the memory $CFC_1$. This operation takes place under the direction of the modules $M_1$ of $DA_1$ and $CA_1$.

132: Under the direction of the module $M_1$ of $CA_1$, $CA_1$ indicates to $DA_1$ that one or more pages of the buffer 17 have been allocated with a view to temporarily memorizing there the data block to be written.

133: In response to step 132, $DA_1$ transfers the data block to be written to the buffer memory 17 of $CA_1$.

134: As soon as the data block has been transferred to 17, it is then transferred to the memory $CFC_1$, under the direction of $M_{11}$.

The set of operations 128A–134 is performed in parallel with operation 30 (see above).

After this operation 30, the procedure continues with operation 31.

31) The module $M_8$ releases the resource, once the set of data of the block to be written has been inscribed there.

32) Once the resource has been released, the module $M_{10}$ releases the pages of the buffer memory $MTD_1$ that had been allocated.

33) Once operation 32 has been completed, $DA_1$ sends a message, under the direction of the module $M_1$, to the host adaptor for the host adaptor to release its host buffer memory $MTH_1$, which it does in operation 34.

If the host adaptor $HA_1$ proves to be unavailable, it is replaced with the corresponding adaptor of $UC_2$, that is, $HA_2$. Similarly, $DA_2$ then replaces $DA_1$. The dialog is established then between $HA_2$, $DA_2$ and $CA_1$, via $B_2$.

If the entire unit $UC_1$ is unavailable, the data contained in $CA_1$, also inscribed in $CA_2$, are read directly in the latter, and the dialog then takes place between $HA_1$, $DA_2$ and $CA_2$. Once again, the advantage of dual access to the cache memories $CA_1$, $CA_2$ and the redundancy of the information inscribed in both $CA_1$ and $CA_2$ is apparent.

Figure 7B:
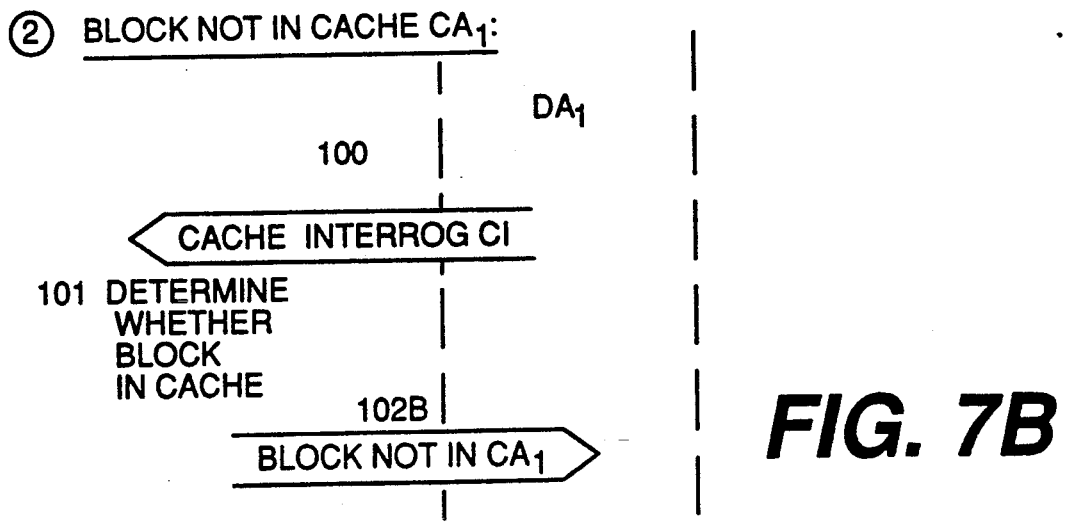
Figure 8B:
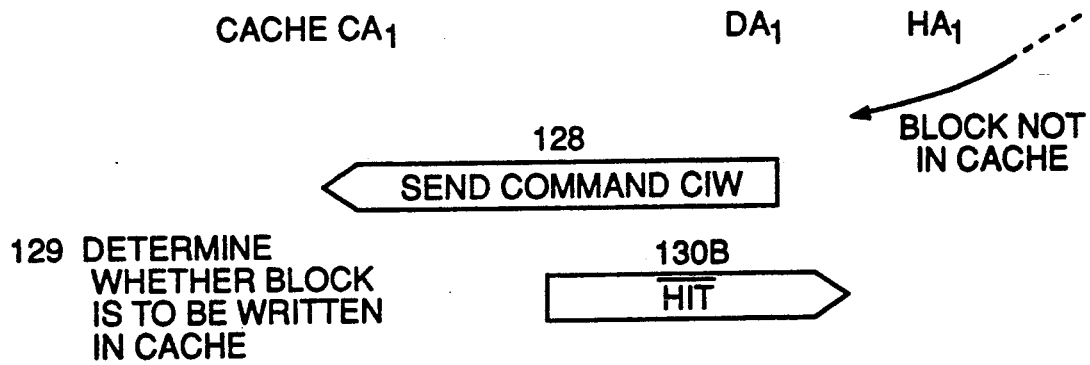

It can be confirmed from FIGS. 6, 7, 8 that a certain number of modules, regardless of whether they are in the host or disk adaptors or in the cache memory, performs a large number of operations that are identical from one hardware element to another. This is true for example for the modules $M_2$ and $M_{10}$. The importance of the modules $M_2$, $M_9$ and $M_8$ will also be appreciated.

It should be noted that all the operations of reading and writing of a predetermined data block are performed in the same manner with respect to the two solid-state disk units $DE_1$ and $DE_2$. In the same way as in rotary disk memories, the block of data to be written is divided into sectors containing the same number of bytes, and the set of information in one sector is inscribed in the memory location the addresses of which succeed one another, for example by one unit. In a preferred embodiment of the invention, the data are written in a format of 39 or 32 useful bits distributed into four bytes added to seven error correction bits ECC (for error corrector code); this error corrector code is conventionally used in dynamic RAM memories. For the reading method and writing method as described in FIGS. 7 and 8 to be used equally well in a solid-state disk such as $DE_1$ or $DE_2$, all that needs to be done is to replace the disk adaptor $DA_1$ with the mother board $CMD_1$ in all the above explanations; the microprocessor 26 plays the same role as the microprocessor $MPD_1$, and the buffer memory 27 plays the same role as the buffer memory $MTD_1$ of the disk adaptor. Once the data have been written in the memory $CFD_1$, the backup disk memory $MSD_1$ is updated; it receives the same data block as has been written in the memory $CFD_1$, these data deriving from the host buffer $MTH_1$.

What is claimed is:

1. A peripheral mass-memory subsystem ($PSS_1$, $PSS_2$) belonging to an information processing system comprising at least one central host ($H_1$, $H_2$, $H_3$, $H_4$) connected to two redundant control units ($UC_1$, $UC_2$) of a plurality of mass memory units of various types including disk memory banks, solid-state disks and cache memories each having means for memorizing data sent by said at least one central host, said control units being connected to two parallel-type buses ($B_1$, $B_2$), wherein said control units each include the following structural elements:
at least one first host adaptor ($HA_1$, $HA_2$, $HA_3$, $HA_4$) connected to said at least one central host and to at least one of said buses,
a central processor ($PR_1$, $PR_2$) connected to said buses,
at least one disk memory adaptor connected to at least one of said buses and to a respective disk memory bank, wherein said disk memory adaptor is accessible by both of said control units,
at least one solid-state disk connected to said buses,
at least one cache memory connected to said buses,
an independent electrical power supply ($ALIM_1$, $ALIM_2$, $BAT_1$, $BAT_2$),
wherein each of said structural elements includes a hardware structure associated with a software subassembly (H,D,P,C,S), the hardware structure comprising a first part which includes at least one connection interface connected with at least one of said buses and a corresponding element control processing means, and a second part specific to each of said structural elements, said first part of said structural element being identical to all other first parts of said structural elements, and further wherein the software subassembly is specific to each said structural element and processed by said element control processing means, each said software subassembly being composed of a plurality of modules ($M_0$, ..., $M_{18}$) with said module having a particular function, wherein at least some of said modules are identical from one of said software subassemblies to another of said software subassemblies.

2. The subsystem of claim 1, wherein the host adaptor and the disk memory adaptor each include a mother board ($CMH_1$, $CMD_1$) associated with a daughter board ($CFH_1$–$CFD_1$), the mother boards, being structurally identical to one another, including the following first processing means:
a) a buffer memory ($MTH_1$, $MTD_1$) for receiving data blocks sent by said central host, that are to be written or read in the disk memories;
b) a control microprocessor for controlling an associated adaptor ($MPH$, $MPD_1$);
c) a RAM-type memory ($RAH_1$), for receiving instructions of the modules (H,D) of the software subassembly of the corresponding adaptor, and for receiving said data blocks;
d) a microprocessor ($MCH_1$, $MCD_1$) for interconnection of the corresponding adaptor to the other structural elements of the control units;
and further including an interface for connection with at least one of the two buses,
wherein the first processing means and the interface are connected to an internal bus ($BI_1$, $BI_2$) of the control microprocessor.

3. The subsystem of claim 2, wherein the daughter board ($CFH_1$) of the host adaptor includes an interface ($IH_1$) for connection with the central host, and wherein the daughter board ($CFD_1$) of the disk adaptor includes an interface ($ID_1$) for linkage with the disk memory ($BMD_1$).

4. The subsystem of claim 2, wherein the software subassembly (H) specific to the host adaptor ($HA_1$) includes the following different modules:
the module $M_0$ relating to an operating system of the host adaptor ($HA_1$) and operable to organize linkage between the various modules composing the software subassembly (H);
the module $M_1$ for managing transfer of information to the host adaptor and the other structural elements by way of the parallel-type bus ($B_1$, $B_2$) to which the adaptor is connected;
the module $M_2$ for managing a host interface ($IH_1$);
the module $M_3$ for managing a stack of commands contained in the RAM-type memory ($RAH_1$) of the host adaptor ($HA_1$);
the module $M_4$ for executing commands addressed to the control units ($UC_1$ and $UC_2$) by the central host ($H_1$);
the module $M_6$ for restarting and error processing when an error is detected in the host adaptor ($HA_1$);
the module $M_{10}$ for managing the buffer memory ($MPH_1$) of the host adaptor ($HA_1$).

5. The subsystem of claim 2, wherein the software subassembly (D) specific to the disk memory adaptor ($DA_1$) includes the following different modules;
the module $M_0$ relating to the operating system of the host adaptor ($HA_1$) and operable to organize linkage between the various modules composing the software subassembly H;
the module $M_1$ for managing transfer of information according to the host adaptor and the other structural elements by way of the parallel-type bus ($B_1$, $B_2$) to which the adaptor is connected;

the module $M_3$ for managing a stack of commands contained in the RAM-type memory ($RAH_1$) of the host adaptor ($HA_1$);

the module $M_6$ for restarting and error processing when an error is detected in the host adaptor ($HA_1$);

the module $M_{10}$ for managing the buffer memory ($MPH_1$) of the host adaptor ($HA_1$); and the module $M_9$ for interpreting commands of the central host to the disk memory ($BMD_1$).

6. The subsystem of claim 1, wherein the central processor ($PR_1$-$PR_2$), the solid-state disk unit ($DE_1$, $DE_2$) and the cache memory each include at least one mother board, whether or not connected to a daughter board, and the mother boards, which are identical in hardware to one another, include the following second processing means:

two microcontrollers (3-4, 13-14, 23, 24) for interconnection with the other structural elements of the subassembly by way of the two buses ($B_1$ and $B_2$);

a command microprocessor (6, 16, 26) for command of the corresponding structural element;

a buffer memory (7, 17, 27);

a RAM-type memory (8, 18, 28) containing the modules of the respective subassembly (P,S,C,) of the corresponding structural element and data to be processed by the command microprocessor;

and further including:

two interfaces (1-2, 11-12, 21-22) for communication with the two buses ($B_1$, $B_2$); wherein the second processing means and the two interfaces are connected to an internal bus of said command microprocessor (5, 15, 25).

7. The subsystem of claim 6, wherein the software subassembly (S) of the solid-state disk units includes the following modules:

the module $M_0$ relating to the operating system of the host adaptor ($HA_1$) and operable to organize linkage between the various modules composing the subassembly H;

the module $M_1$ for managing transfer of information according to the host adaptor and the other structural elements by way of the parallel-type bus ($B_1$, $B_2$) to which the adaptor is connected;

the module $M_3$ for managing a stack of commands contained in the RAM-type memory ($RAH_1$) of the host adaptor ($HA_1$);

the module $M_6$ for restarting and error processing when an error is detected in the host adaptor ($HA_1$);

the module $M_{10}$ for managing the buffer memory ($MPH_1$) of the host adaptor ($HA_1$); and the module $M_9$ for interpreting commands from the central corresponding solid-state disk unit.

8. The subsystem of claim 6, wherein the software subassembly (C) of the cache memories ($CA_1$, $CA_2$) includes the following modules:

the module $M_0$ relating to the operating system of the host adaptor ($HA_1$) and operable to organize linkage between the various modules composing the subassembly H;

the module $M_1$ for managing transfer of information according to the host adaptor and the other structural elements by way of the parallel-type bus ($B_1$, $B_2$) to which the adaptor is connected; and the module $M_{11}$ for managing the tables of the cache memories ($CA_1$, $CA_2$).

9. The subsystem of claim 6, wherein the software subassembly (P) of the central processors ($PR_1$, $PR_2$) includes the following modules:

the module $M_0$ relating to the operating system of the host adaptor ($HA_1$) and operable to organize linkage between the various modules composing the subassembly H;

the module $M_1$ for managing transfer of information according to the host adaptor and the other structural elements by way of the parallel-type bus ($B_1$, $B_2$) to which the adaptor is connected; and the module $M_{12}$ for initializing the corresponding control units ($UC_1$, $UC_2$);

the module $M_{13}$ for communication between the two control units charged in particular with establishing exchanges of information between the units when on of the structural elements thereof is unavailable;

the module $M_{14}$ for managing the power supply ($ALIM_1$, $ALIM_2$) of the control unit commanded by the central processor;

the module $M_{16}$ for salvaging information in the control unit commanded by the central processor during a power failure;

the module $M_{17}$ for restarting writing or reading operations in the corresponding solid-state disk unit after a power failure has occurred, and further for salvaging information from the module $M_{16}$ during a power failure; and the module $M_{18}$ for managing the interface between a backup disk memory ($MSD_1$) and the central processor ($PR_1$), wherein the back-up disk memory is connected to the central processor and to the solid state disk unit ($DE_1$).

* * * * *

UNITED STATES PATENT AND TRADEMARK OFFICE
CERTIFICATE OF CORRECTION

PATENT NO. : 5,325,488
DATED : June 28, 1994
INVENTOR(S) : CARTEAU et al

It is certified that error appears in the above-indentified patent and that said Letters Patent is hereby corrected as shown below:

Col. 18, line 2 (Claim 1, line 70) after "with" insert --each--.

Col. 18, line 17 (Claim 2, line 12) after "($RAH_1$" insert --,$RAD_1$)--.

Signed and Sealed this

Twenty-first Day of March, 1995

Attest:

BRUCE LEHMAN

*Attesting Officer*    *Commissioner of Patents and Trademarks*